United States Patent
Hockey et al.

(10) Patent No.: US 12,413,427 B2
(45) Date of Patent: Sep. 9, 2025

(54) MUTUAL AUTHENTICATION BETWEEN CLUSTERS

(71) Applicant: MICROSOFT TECHNOLOGY LICENSING, LLC, Redmond, WA (US)

(72) Inventors: Alex John Hockey, London (GB); James Warren Turner, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 462 days.

(21) Appl. No.: 17/852,302

(22) Filed: Jun. 28, 2022

(65) Prior Publication Data
US 2023/0353392 A1 Nov. 2, 2023

(30) Foreign Application Priority Data
Apr. 28, 2022 (GB) .................................. 2206156

(51) Int. Cl.
H04L 9/32 (2006.01)
(52) U.S. Cl.
CPC .......... *H04L 9/3273* (2013.01); *H04L 9/3265* (2013.01); *H04L 9/3268* (2013.01)
(58) Field of Classification Search
CPC ... H04L 9/3273; H04L 9/3265; H04L 9/3268; H04L 9/0891
See application file for complete search history.

(56) References Cited

U.S. PATENT DOCUMENTS 9,910,881 B1 * 3/2018 Brooker .............. H04L 41/0859
11,038,854 B2 * 6/2021 Gero ..................... H04L 9/0825
(Continued)

FOREIGN PATENT DOCUMENTS

WO 2020251828 A1 12/2020

OTHER PUBLICATIONS

"F5 SSL Orchestrator Deployment Guide > 2.6. Creating an Existing Application Topology" Sep. 18, 2020 [retrieved on Sep. 15, 2024]. Retrieved from the internet: <URL: https://clouddocs.f5.com/sslo-deployment-guide/chapter2/page2.6.html> (Year: 2020).*

(Continued)

*Primary Examiner* — Hany S. Gadalla
(74) *Attorney, Agent, or Firm* — Han Gim; Newport IP, LLC (57) ABSTRACT

A method of processing traffic to provide a service is described. A first service mesh in a first cluster is used to ensure traffic is communicated within the first cluster using a secure communications protocol with mutual authentication accomplished using a certificate chain having a root certificate. A client in the first cluster originates traffic to a second cluster for processing, the second cluster having access to the root certificate. Using the first service mesh, routing the traffic to the second cluster is done using a secure communications protocol with mutual authentication. Mutual authentication is carried out between the first cluster and the second cluster using certificate chains having the root certificate; and in response to the mutual authentication being successful, application data is routed to the second cluster using the secure communications protocol such that the application data may be processed at the second cluster to provide the service.

20 Claims, 5 Drawing Sheets

(56) References Cited

U.S. PATENT DOCUMENTS

| | | |
|---|---|---|
| 11,153,412 B1 | 10/2021 | Varadan et al. |
| 2015/0169875 A1* | 6/2015 | Ide .................. G06F 21/575 |
| | | 713/2 |
| 2021/0203732 A1* | 7/2021 | Webb .................. H04L 43/0817 |
| 2022/0103570 A1* | 3/2022 | Nainar ................ H04W 12/102 |
| 2023/0155984 A1* | 5/2023 | Adam ................ H04L 63/0281 |
| | | 726/26 |
| 2023/0188382 A1* | 6/2023 | Nath ................ G06F 15/17312 |
| | | 709/222 |

OTHER PUBLICATIONS

Jannot, Denis, "Identity Federation for Multi-Cluster Kubernetes and Service Mesh", Retrieved from: https://www.solo.io/blog/identity-federation-for-multi-cluster-kubernetes-and-service-mesh/, Sep. 22, 2020, 17 Pages.

"International Search Report and Written Opinion Issued in PCT Application No. PCT/US2023/012656", Mailed Date: May 19, 2023, 12 Pages.

* cited by examiner

MUTUAL AUTHENTICATION BETWEEN CLUSTERS

CROSS-REFERENCE TO RELATED APPLICATION(S)

This non-provisional utility application claims priority to GB patent application number 2206156.8 entitled "MUTUAL AUTHENTICATION BETWEEN CLUSTERS" and filed on Apr. 28, 2022, which is incorporated herein in its entirety by reference.

BACKGROUND

Cloud technology serves as a potential solution to meet the demands of application providers seeking to outsource the management of hardware resources such as telecommunications hardware resources. However, considering the resources available through cloud services are used by multiple parties, cloud technology is typically not sufficient to meet the significant security and/or reliability requirements of handling application requests such as telephony application requests. Therefore, there is a need for telephony applications deployed using cloud technology which are able to provide high levels of reliability and/or security.

Where a telephony service or application is deployed in the cloud the functionality of the service is typically provided using a plurality of clusters, each cluster comprising one or more compute nodes where functionality providing at least part of the service is installed. By using clusters it is possible to gain geographical redundancy, operational isolation and geographical data residency requirements. However, it can be difficult to enable trusted processing of traffic passing between clusters. If a given cluster passes traffic to another cluster which is untrusted, there is potential for a security breach since the other cluster may have been tampered with or may have been introduced by a malicious party.

The embodiments described below are not limited to implementations which solve any or all of the disadvantages of known communication between clusters.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of processing traffic to provide a service is described. A first service mesh in a first cluster is used to ensure traffic is communicated within the first cluster using a secure communications protocol with mutual authentication accomplished using a certificate chain having a root certificate. A client in the first cluster originates traffic to a second cluster for processing, the second cluster having access to the root certificate. Using the first service mesh, routing the traffic to the second cluster is done using a secure communications protocol with mutual authentication. Mutual authentication is carried out between the first cluster and the second cluster using certificate chains having the root certificate; and in response to the mutual authentication being successful, application data is routed to the second cluster using the secure communications protocol such that the application data may be processed at the second cluster to provide the service.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As explained above, where a telephony service or application is deployed in the cloud the functionality of the service is typically provided using a plurality of clusters, each cluster comprising one or more compute nodes where functionality providing at least part of the service is installed. By using clusters it is possible to gain geographical redundancy, operational isolation and geographical data residency requirements. However, it can be difficult to enable trusted processing of traffic passing between clusters. If a given cluster passes traffic to another cluster which is untrusted, there is potential for a security breach since the other cluster may have been tampered with or may have been introduced by a malicious party.

Figure 1:
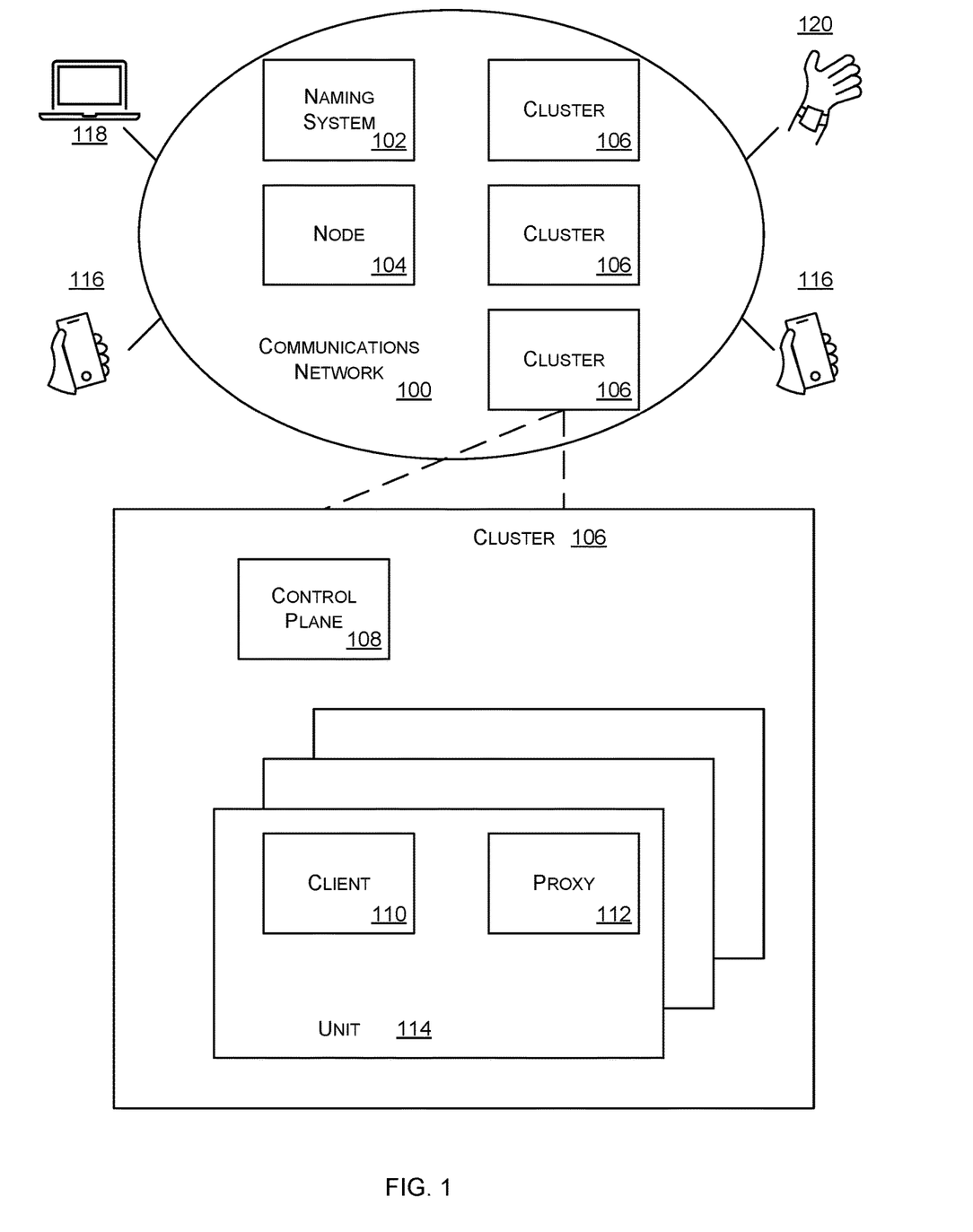
FIG. 1 shows a communications network containing a plurality of clusters for providing one or more services in a secure manner.

FIG. 1 shows a communications network 100 containing a plurality of clusters 106 for providing one or more services in a secure manner. Traffic in one of the clusters (referred to as an origin cluster) is to be routed to another one of the clusters; although note that a given cluster is able to act as both an origin cluster and a destination cluster. There are various ways in which the traffic in the origin cluster originates or is driven and some examples of these are now given in order to provide context for the technology. However, it is noted that the technology is not limited to any one particular scenario which drives traffic in the origin cluster.

In a non-limiting example, traffic is driven in the origin cluster as a result of a subscriber to a service, such as a smart phone 116, laptop computer 118, smart watch 120 accessing the service via the communications network 100. In an example, the service is a telephony service such as a mobile voice mail service. Other examples of services are: any voice over internet protocol service, web service, operations and management service, network based application programming service that is accessed by other services, an internet of things management service, a gaming service.

In a non-limiting example of how the traffic is driven in the origin cluster, the communications network comprises a naming system 102 such as a domain name system 102 as well as a node 104 such as a session border controller, router, load balancer or any other communications network node. A request for a service is sent by one of the subscriber devices and received at node 104. Node 104 sends a request for the service to the naming system 102 which returns an address of one of the clusters according to its knowledge of available capacity at the clusters, load balancing rules and other factors. The address of the specified cluster is used by the node 104 to forward traffic from the subscriber device to the specified cluster. This example of how the traffic is driven in the origin cluster is given to provide context for the technology and is not intended to be limiting.

FIG. 1 shows three clusters 106 although in practice there are many tens or hundreds of clusters. FIG. 1 shows an exploded view of one of the clusters 106 comprising a control plane 108 and a plurality of units 114. The units are smallest deployable units of a service such as a telephony service. In an example the units are Kubernetes (trade mark) pods where the service is orchestrated using Kubernetes (trade mark). However, it is not essential to orchestrate the service using Kubernetes (trade mark) as any orchestrator may be used including but not limited to: Docker Swarm (trade mark), Nomad (trade mark), Redhat OpenShift (trade mark), Amazon Elastic Container Service (trade mark).

FIG. 1 shows three units 114 although in practice there are hundreds or thousands of units 114 in a cluster 106.

Where the service deployed using the clusters 106 is to be secure, security is achieved within each cluster by using a service mesh within each cluster 106. A service mesh in a cluster 106 comprises a control plane 108 and a plurality of proxies, one in each of the units 114; that is, each unit comprises a proxy 112 and a client 110 or server. Where a client 110 is present in a unit 114 the client 110 has ability to request functionality of the service from a server. Where a server is present the server has functionality of the service.

As explained above it can be difficult to enable trusted communication of traffic passing between clusters. Trusted communication of traffic means sending encrypted traffic, optionally including application data, over a session between parties where the parties have mutually authenticated one another. In some cases trusted communication of traffic also includes mutual authorization of the parties to the session. If a given cluster passes traffic to another cluster which is untrusted, there is potential for a security breach since the other cluster may have been tampered with or may have been introduced by a malicious party. Since the clusters are able to provide many different services it cannot be assumed that the units within the clusters, or the clusters themselves are trusted. The traffic may contain content which is to be kept secure such as passwords or other confidential information.

When deploying services in a zero trust manner it is desired to encrypt network communications between machines (such as the machines on which the units 114 and clusters 106 are executing), and ensure that units 114 authenticate and authorize the other units 114 they talk to. For transport control protocol (TCP) connections within a cluster 106 (such as between units 114) this may be done using mutual transport layer security (mTLS). However, it is not essential to use mutual transport layer security as other protocols which are secure and include mutual authentication may be used such as internet protocol security (IPsec) or protocol-specific mechanisms.

In order to ensure that a secure communications protocol with mutual authentication is used within a cluster 106 it is possible to use a service mesh. The service mesh is installed in the cluster, and automatically performs encryption, authentication and optionally authorization. This is achieved by installing a sidecar proxy 112 (which is optionally a container) into every unit 114, along with network routing rules to redirect traffic via the proxy 112. There is also a control plane 108 that runs inside the cluster 106. It programs the proxies 112 with rules to handle traffic and enforce security policy.

The inventors have recognized that service meshes work well when traffic is confined to a single cluster 106. The control plane 108 can see the units 114 and services in the cluster 106, and therefore which ports and internet protocol addresses or virtual internet protocol addresses are in use, so can easily program the proxies 114 with suitable rules. However, the inventors recognize that when traffic is to leave or enter the cluster 106, things are more complicated and there are risks of security breaches.

There are two typical approaches for handling "extra-cluster" traffic.

A first approach involves using an ingress gateway (with optional egress gateway). With this first approach, it is possible to separately configure the ingress and egress points to perform authentication and authorization and enforce security policy. However, using an ingress gateway adds more networking hops. It also adds complexity, as the service mesh now is to be either a) configured with or b) able to learn remote gateway addresses (domain names, internet protocol addresses, ports) thereby coupling the clusters together more. For some protocols where the client makes routing decisions it is not possible to insert a gateway into the communications path meaning that this first approach is not viable.

A second approach involves joining the clusters together into an "uber-mesh" whereby cluster control planes are joined together so that they can exchange topological information and configure the proxies with knowledge of the remote clusters. This is operationally complex and fragile.

The present disclosure describes, how extra cluster traffic is enabled in a secure manner. Independent service meshes are used in each cluster, and the service meshes use certificates signed by a common root certificate. Clusters are provided with rules to identify traffic destined for another cluster and are also set up to enable certain traffic flows direct to the cluster units 114. In this way there is no need for an additional ingress or egress gateway, or to create an "uber mesh". In some cases, the rules are static and topologically agnostic.

Figure 2:
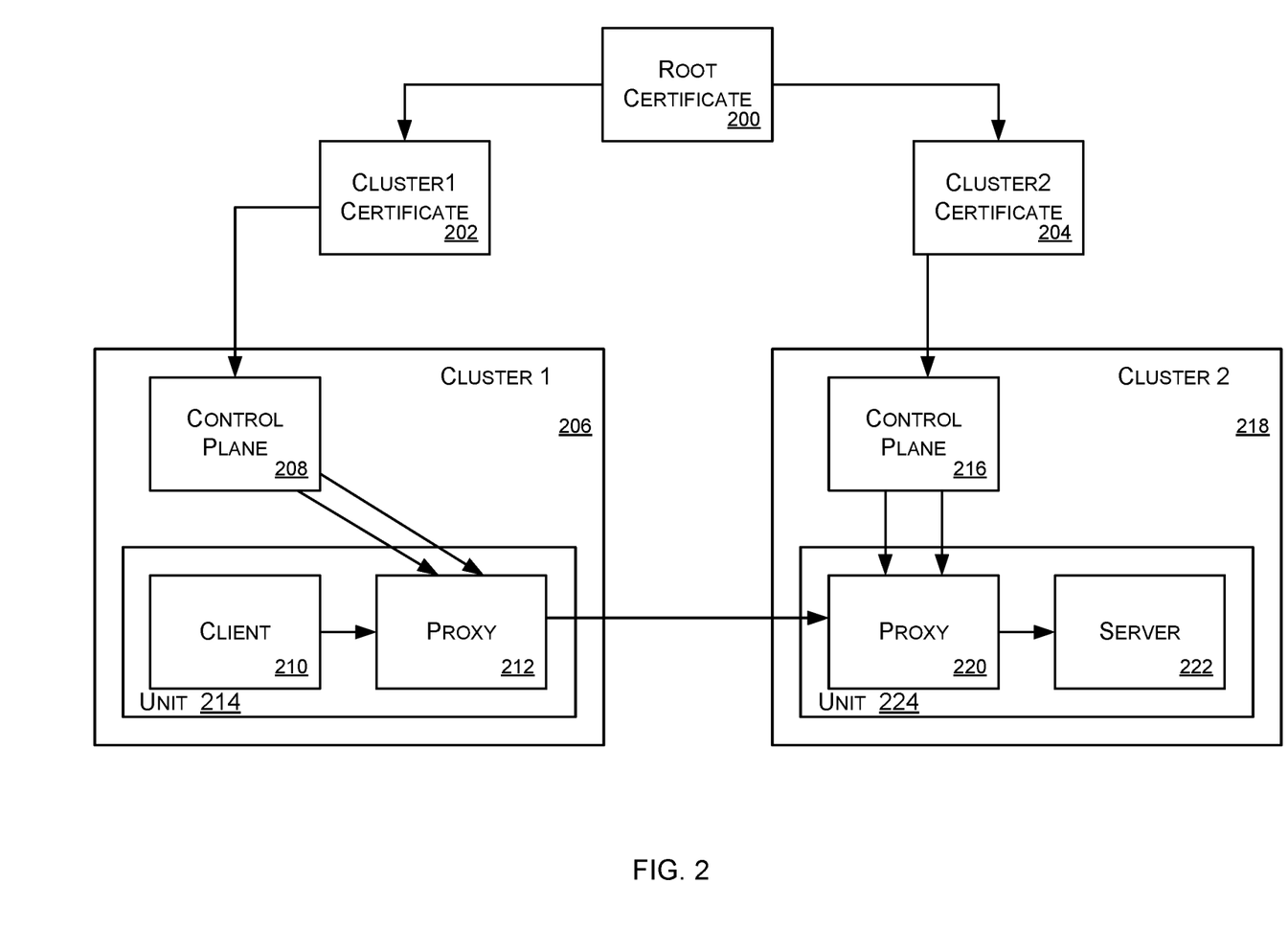
FIG. 2 is a schematic diagram of two clusters of the communications network of FIG. 1.

FIG. 2 is a schematic diagram of two clusters of the communications network of FIG. 1. FIG. 2 shows a first cluster 206 and a second cluster 218. The first cluster 206 has a control plane 208 and a plurality of units 214 together forming a first service mesh. Each of the units 214 has a proxy and a client or server. At least one of the units 214 comprises a client 210 and a proxy 212. The second cluster 218 also has a control plane 216 and a plurality of units 224 together forming a second service mesh. Each of the units 224 has a proxy 220 and a client or server 222. The first and second service meshes are independent of one another since they do not share information except for a root certificate 200 as now explained.

Preferably, the addresses of the units of the first and second clusters are routable from each other. This may be achieved by deploying the first and second clusters on the same virtual network and using a networking plugin.

A root certificate 200 is available at a secure location in the communications network 100 of FIG. 1 and is accessible to both the clusters. Certificate chains are formed from the root certificate whereby the first cluster has a first cluster certificate 202 and the second cluster has a second cluster certificate 204. The control plane 208 of the first cluster 206 uses the first cluster certificate to issue leaf certificates to its proxies 212 such that the leaf certificates are also ultimately signed by the root certificate 200. The control plane 216 of the second cluster 218 uses the second cluster certificate 204 to issue leaf certificates to its proxies 220 such that the leaf certificates are also ultimately signed by the root certificate. Thus each service mesh trusts the root certificate 200. The control plane 208 in the first cluster and control plane 216 in the second cluster ensure that secure communication protocol handshakes are signed by the common root certificate 200. Thus units 214, 224 are able to verify each other's certificates because they trust the root certificate 200. The present example uses three levels of certificate: root, intermediate and leaf. However, it is also possible to have more than three levels of certificate by adding more intermediate levels.

Suppose that the clusters of FIG. 2 are used to process traffic in order to provide a secure service. A client at unit 214 of the first cluster decides to initiate a connection to a server that is not in the same cluster. A first service mesh in the first cluster 206 is being used to ensure that traffic is communicated within the first cluster using a secure communications protocol with mutual authentication accomplished using a certificate chain having a root certificate 200. When the client at unit 214 of the first cluster initiates a connection to a server that is not in the same cluster, the client sends traffic addressed to a port at the server in the second cluster. The traffic travels via the proxy in the unit 214 due to the service mesh in the first cluster. The proxy is part of the first service mesh and so it secures traffic destined within the first cluster. However, the request is addressed to an address outside the first cluster so normally the proxy would forward the traffic in an unsecured manner. However, a configuration of the proxy has been arranged to ensure the traffic is sent using a secure protocol with mutual authentication. The configuration is static and agnostic to the topology of the destination cluster. The second cluster 201 has access to the root certificate 200. Mutual authentication is carried out between the first cluster 206 and the second cluster 218 using certificate chains having the root certificate 200. If the mutual authentication is successful the client in the first cluster proceeds to send application data to the server in the second cluster over the secure, mutually authenticated route. The control plane is optionally modified so that the first cluster does not access any other services using the specified port. In this way, inadvertent transmission of other services outside the cluster is avoided.

In an example, with reference to FIG. 2, the control plane of the first cluster sends a configuration to a proxy in the first cluster indicating "originate TLS on port 8000". The control plane of the second cluster sends a configuration to a proxy in the second cluster indicating "terminate TLS from cluster 1 on port 8000".

When the client in the first cluster sends a request to connect to port 8000 at address 10.0.2.77 the proxy checks its config and finds that it should originate TLS from its port 8000. The address 10.0.2.77 is the address of the server in the second cluster. The proxy in the first cluster validates the certificate chain of the proxy in the second cluster. The proxy in the second cluster validates the certificate chain of the proxy in the first cluster.

Note that in FIG. 2 the first cluster comprises a unit with a client and the second cluster comprises a unit with a server. However, others of the units in the first cluster may comprise servers rather than clients. The same applies for the second cluster.

In response to the mutual authentication being successful, application data is routed to the second cluster 218 using the secure communications protocol such that the application data may be processed at the second cluster 218 to provide the service. In this way, application data routed to a specified service port is uplifted to a secure communications protocol, even if the connection will leave the cluster.

The extra cluster traffic and/or application data processing is achieved without any change to the application providing the service or the overall solution design. It is possible to continue to use the existing DNS setup.

The process does not require additional gateways to be added. This is useful for reducing overall hardware footprint/cloud spend. But it also means it is possible to handle protocols that cannot be proxied by a service mesh ingress gateway, either because the gateway does not understand the protocol in use (such as session initiation protocol (SIP)) or because the protocol cannot be used with a proxy.

The arrangement of FIG. 2 is simple to setup and operate. It scales well to large numbers of clusters. It does not require that the same secure communications protocol technology is used everywhere. Different service meshes can be used in different clusters.

The first and second clusters of the disclosure operate in an unconventional manner to enable extra cluster traffic to be processed in a secure and efficient manner, without the need for an additional ingress or egress gateway.

The first and second clusters together with the root certificate improve the functioning of the underlying communications network by enabling traffic to be sent between clusters in a secure manner.

Alternatively, or in addition, the functionality of one or more of the clusters 206, 218 herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs).

Figure 3:
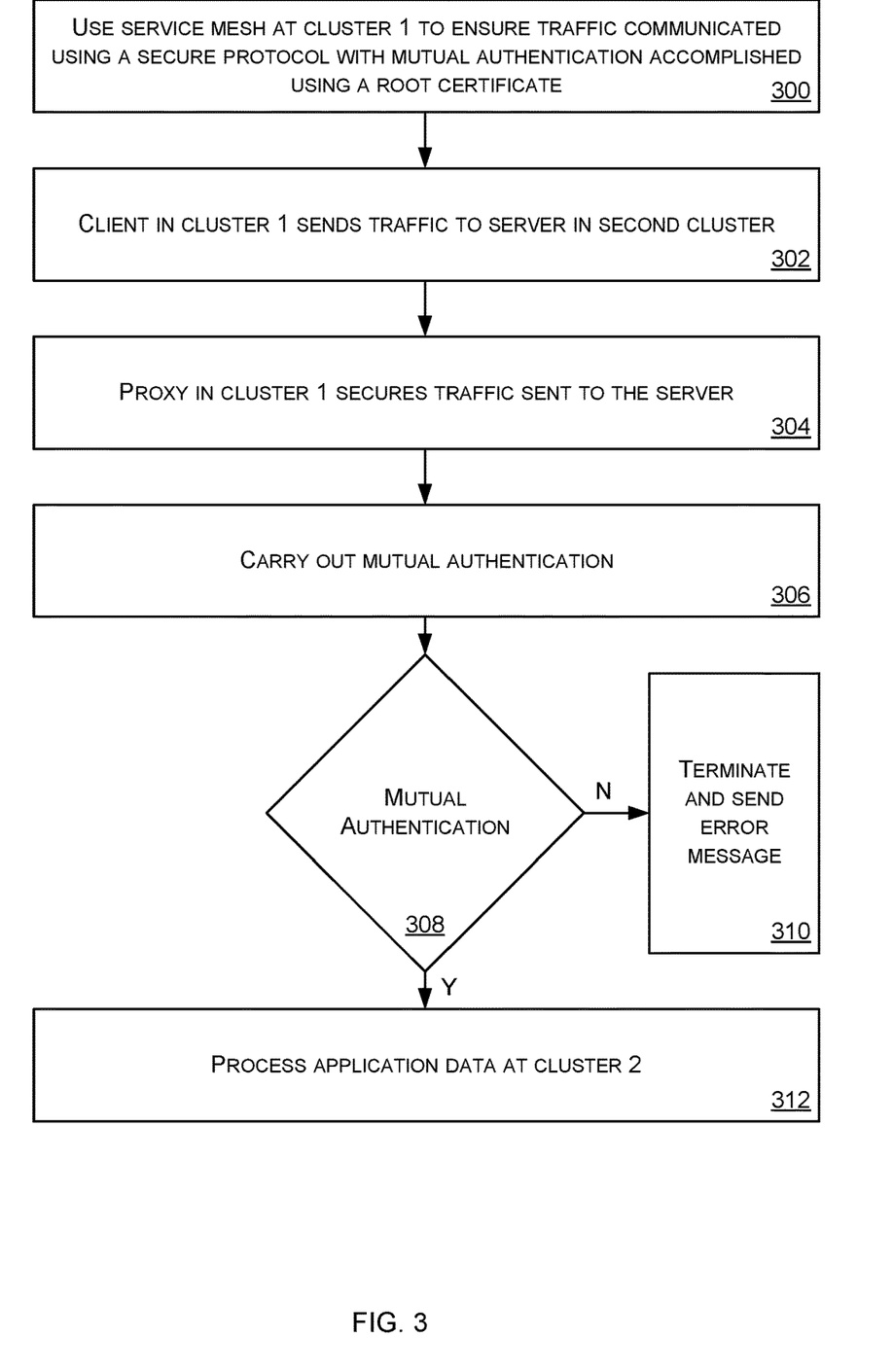
FIG. 3 is a flow diagram of a method of operation performed by the clusters of FIG. 2.

FIG. 3 is a flow diagram of a method of operation performed by the clusters of FIG. 2.

The service mesh at the first cluster is used to ensure 300 traffic within the first cluster is communicated within the first cluster using a secure communications protocol with mutual authentication accomplished using a root certificate. The service mesh achieves this by enforcing all traffic entering a unit to be processed by the proxy of the unit. The control plane of the service mesh configures the proxies so that the proxies process the traffic they receive according to rules. Thus the proxies encrypt the traffic, or block traffic which is not encrypted already. The proxies send or receive traffic using secure communication sessions which are successfully mutually authenticated using certificate chains from the root certificate.

A client in a unit in the first cluster decides to send 302 traffic to a server in the second cluster and so sends traffic to an address of a port at the server in the second cluster. The traffic from the client passes first to the proxy in the unit due to the presence of the service mesh at the first cluster. The service mesh uses its proxy configurations (also referred to as a proxy config) comprising one or more rules such as rules indicating that if traffic is addressed to a specified port then security needs to be applied to the traffic even though it is leaving the first cluster. The proxy therefore secures 304 the traffic being sent to the server. The service mesh at the first cluster is not necessarily aware of the fact that the identified traffic will be routed to the second cluster. More detail about how the proxy configuration is established is described later with reference to FIG. 4.

The first cluster carries out 306 mutual authentication with the second cluster. More specifically, a client in a unit of the first cluster which is configured to forward the traffic to a server in a unit in the second cluster establishes a communication session with the server. As part of the establishment of the communication session, mutual authentication is carried out using a handshake process such as a TLS handshake.

In response to mutual authentication succeeding application data is sent over the communication session from the client to the server and is processed 312 at the second cluster using the server at the second cluster. In this way functionality at the second cluster is harnessed in a secure and efficient manner which facilitates scalability.

In response to mutual authentication failing, the communication session terminates and an error message is returned 310.

Figure 4:
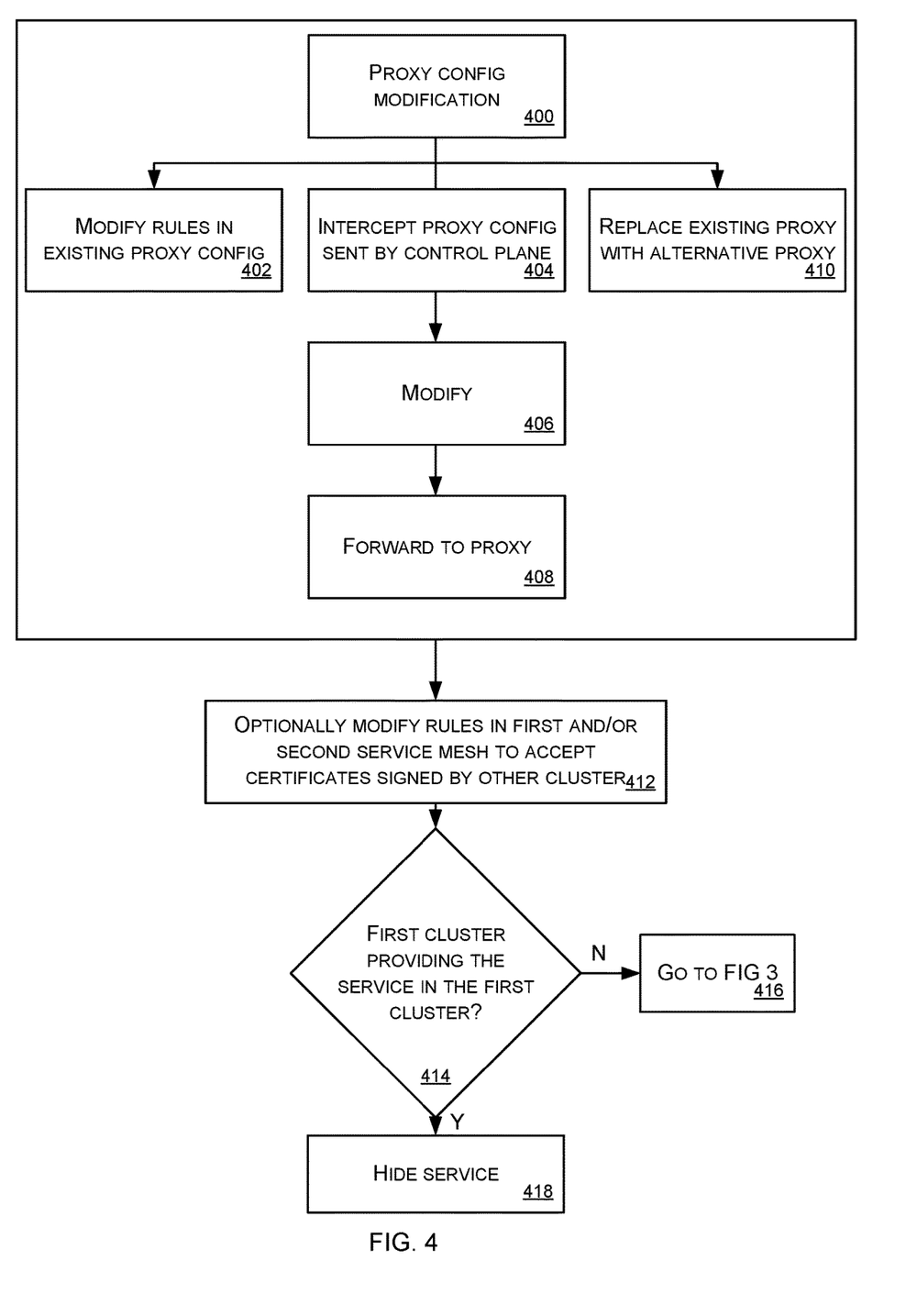
FIG. 4 is a flow diagram of a method of configuring a first cluster.

FIG. 4 is a flow diagram of a method of configuring a cluster such as the first and/or second cluster of FIG. 2. In order to configure the cluster, a configuration of one or more of the proxies in the cluster is modified. The modification is achieved in one or more of the following ways:

In a first way, the modification 402 comprises modifying rules in a configuration of an existing proxy in the cluster. The modification is done automatically using one or more rules or templates. Modifying an existing proxy is fast and efficient.

In a second way, the modification comprises intercepting 404 a proxy configuration sent by the control plane of the cluster to the proxy. The intercepted proxy configuration is modified 406 automatically using one or more rules or templates and the modified proxy configuration is forwarded to the proxy 408. Interception, although more complex to implement that the first way, can be implemented on any service mesh where the interface between the proxy and the control plane is well understood. Interception enables the modification to be carried out before the configuration is installed at the proxy and so reduces the time when the proxy is offline having configuration changes.

In a third way, the modification comprises replacing 410 an existing proxy of the cluster with an alternative proxy. Replacing an existing proxy of the cluster with an alternative proxy can be implemented on any service mesh where the interface between the proxy and the control plane is well understood and does not require any additional functional elements in the system. Replacing an existing proxy is fast and efficient and keeps time when the proxy is unavailable to a minimum. In some cases, supplying an alternative proxy requires development effort.

FIG. 4 also illustrates how, rules in the first and/or second service mesh are optionally modified 412 to accept certificates signed by another cluster. A service mesh might only accept client certificates that have been signed by the local cluster (and include the local cluster's "trust domain" string). In this case it is possible to relax this checking by doing one or more of: allow certain well known cluster names, allow any name that matches an expression, allow any certificate that is signed by the root certificate.

A check is made at operation 414 as to whether the first cluster is providing the service in the first cluster. The check is made by the control plane or any other entity. If the check finds that the service is not provided in the first cluster the process proceeds to that of FIG. 3, (see operation 416 of FIG. 4). Otherwise the service is hidden from the control plane by marking the service with an annotation. The annotation is read by the control plane, and results in the control plane not programming rules for that service into the proxy. This means that attempts to contact the service from inside the first cluster are treated the same way as if the service were in a remote cluster.

In an example using Kubernetes and TLS, an independent service mesh is installed in a first Kubernetes (K8s) cluster and a second K8s cluster. Each service mesh is configured to trust a common root certificate. Each service mesh is provided with a TLS signing certificate that is signed by a common trusted root certificate. The service mesh will use this signing certificate to issue leaf certificates to its proxies, meaning these leaves will also be signed by the root. Thus all certificates presented during TLS handshakes are signed by the common root. Units are able to verify each other's certificates because they trust the root. If a cluster is to originate connections using mTLS to services running outside the cluster via a specified TCP port, the control plane is modified so that the cluster does not access any other services using the same TCP port.

The service mesh is configured so that all connections to the specified TCP port number are uplifted to mTLS by the client's sidecar proxy. Connections are originated as if they are being made to another device inside the mesh and use the leaf certificate provided to the proxy by the control plane. The service mesh might only accept server certificates that have been signed by the local cluster (and include the local cluster's "trust domain" string). In this case it is possible to relax this checking to either allow certain well know cluster names, or allow any name that matches an expression, or allow any certificate that is signed by the root.

In some circumstances, the cluster will also be providing the service in the local cluster, which may be accessed by clients in the local cluster. In this case, it is possible to hide the K8s Service from the service mesh. This means the service mesh control plane will not configure the proxies with additional (potentially conflicting) rules about how to handle traffic to the service port.

In this way traffic to the specified service port is uplifted to mTLS, even if the connection will leave the cluster.

In the example, it is possible to configure the service mesh in the ingress cluster to accept connections from outside the cluster. The service mesh might only accept client certificates that have been signed by the local cluster (and include the local cluster's "trust domain" string). In this case it is possible to relax this checking to either allow certain well know cluster names, or allow any name that matches an expression, or allow any certificate that is signed by the root. This allows clusters to accept incoming connections from other K8s clusters. Thus pods are able to initiate and accept mTLS connections involving other clusters and can verify the peer device's certificate. Using mTLS provides encryption and authentication. It is possible to use the service mesh's authorization support for authorization.

Figure 5:
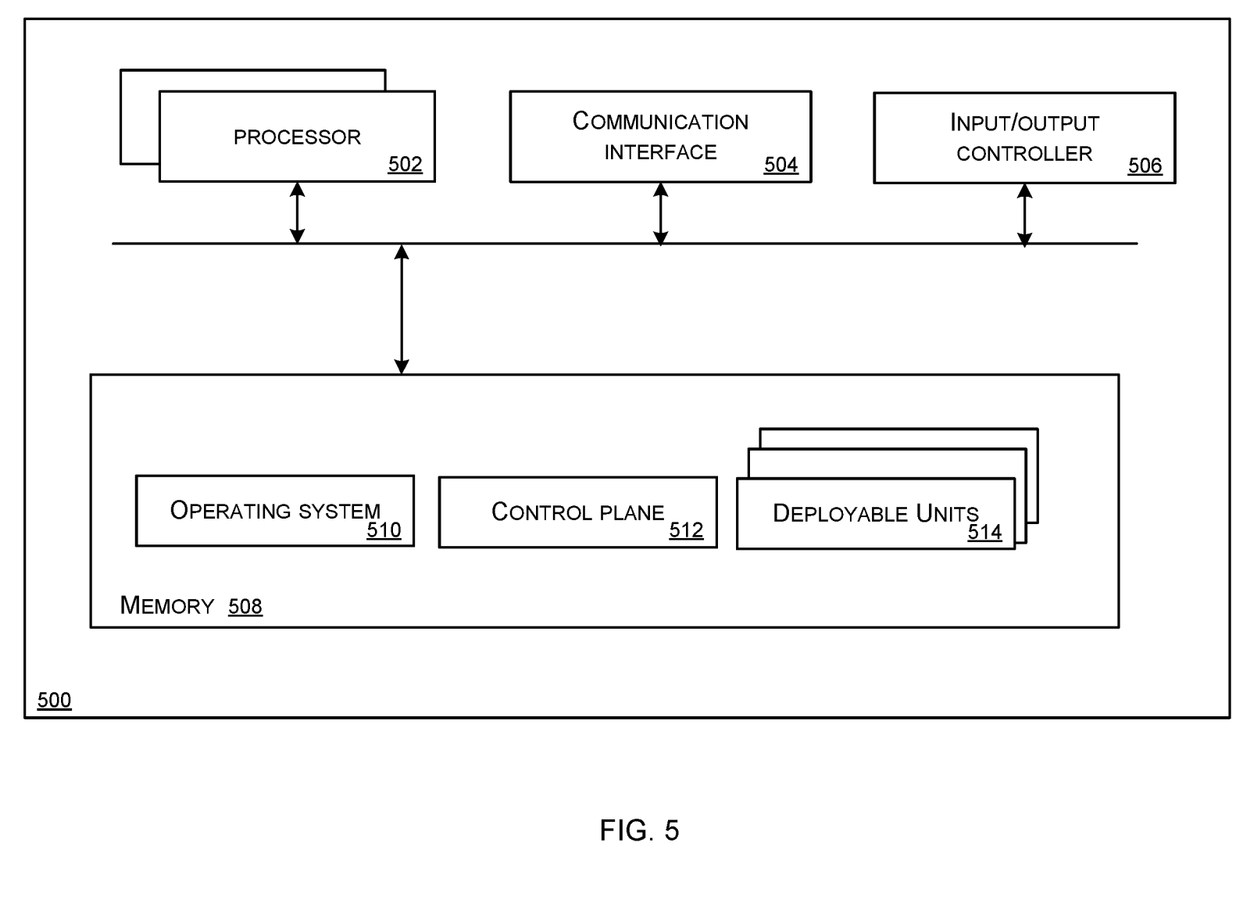
FIG. 5 illustrates an exemplary computing-based device in which embodiments of a cluster are implemented.

FIG. 5 illustrates an exemplary computing-based device in which embodiments of a cluster are implemented.

Computing-based device 500 comprises one or more processors 502 which are microprocessors, controllers or any other suitable type of processors for processing computer executable instructions to control the operation of the device in order to enable secure, authenticated communication of traffic between clusters. In some examples, for example where a system on a chip architecture is used, the processors 502 include one or more fixed function blocks (also referred to as accelerators) which implement a part of the method of authenticated communication of traffic between clusters in hardware (rather than software or firmware). Platform software comprising an operating system 510 or any other suitable platform software is provided at the computing-based device to enable application software in deployable units 514 to be executed on the device. A control plane 512 is present.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 504).

The computing-based device 500 also comprises an input/output controller 506 arranged to output display information to a display device which may be separate from or integral to the computing-based device 500. The display information may provide a graphical user interface. The input/output controller 506 is also arranged to receive and process input from one or more devices, such as a user input device (e.g. a mouse, keyboard, camera, microphone or other sensor). In an embodiment the display device also acts as the user input device if it is a touch sensitive display device. The input/output controller 506 outputs data to devices other than the display device in some examples, e.g. a locally connected printing device.

Alternatively or in addition to the other examples described herein, examples include any combination of the following clauses:

Clause A. A method of processing traffic in a communications network in order to provide a service, the method comprising:

using a first service mesh in the first cluster to ensure the received traffic is communicated within the first cluster using a secure communications protocol with mutual authentication accomplished using a certificate chain having a root certificate;

using a client in the first cluster, originating traffic to a second cluster for processing, the second cluster having access to the root certificate;

using the first service mesh, routing the traffic to the second cluster using a secure communications protocol with mutual authentication;

carrying out mutual authentication between the first cluster and the second cluster using certificate chains having the root certificate; and in response to the mutual authentication being successful, routing application data from the client to the second cluster using the secure communications protocol such that the application data may be processed at the second cluster to provide the service.

Clause B. The method of clause A wherein using the first service mesh to route the traffic to the second cluster using a secure communications protocol with mutual authentication comprises using a configuration of an existing proxy in the service mesh, and modifying rules in the configuration to specify that traffic routed to the second cluster is to be sent using the secure communications protocol with mutual authentication.

Clause C. The method of clause B wherein the configuration of the existing proxy uses a static topology-agnostic configuration to identify traffic to be sent using the secure communications protocol with mutual authentication.

Clause D. The method of clause B wherein the configuration of the proxy is sent to the proxy by a control plane of the service mesh, and wherein the method comprises intercepting the configuration of the proxy after it is sent by the control plane and modifying it before it is received by the proxy.

Clause E. The method of any preceding clause comprising replacing an existing proxy in the service mesh with an alternative proxy, the alternative proxy having a configuration comprising rules to specify that traffic to be routed to the second cluster is to be sent using the secure communications protocol with mutual authentication.

Clause F. The method of any of clauses B to E wherein the configuration comprises a rule indicating that traffic addressed to a specified port number of a server in the second cluster is to be sent using the secure communications protocol with mutual authentication.

Clause G. The method of any preceding clause comprising: modifying rules in the service mesh such that the service mesh is able to accept certificates that have been signed by the second cluster and include a trust domain string of the second cluster.

Clause H. The method of clause G wherein modifying rules in the service mesh comprises modifying rules to allow certain cluster names, or allow any name that matches an expression, or allow any certificate that is signed using the root certificate.

Clause I. The method of any preceding clause wherein the first cluster provides the service in the first cluster, in addition to the second cluster providing the service, and wherein the service is hidden from the first service mesh such that a control plane of the first service mesh does not configure a proxy of the first service mesh with potentially conflicting rules.

Clause J. The method of any preceding clause comprising using a second service mesh, in the second cluster, to ensure that traffic communicated in the second cluster is communicated using a secure communications protocol with mutual authentication accomplished using a certificate chain having the root certificate, and where the second service mesh is independent of the first service mesh except for the root certificate.

Clause K. The method of clause J comprising modifying rules in the second service mesh such that the second service mesh is able to accept certificates that have been signed by the first cluster and include a trust domain string of the first cluster.

Clause L. The method of any preceding clause which is carried out for an existing service without modification to the existing service.

Clause M. A communications network comprising:
a first cluster;
a first service mesh in the first cluster, the first service mesh configured to ensure that traffic to which a service is to be applied is communicated within the first cluster using a secure communications protocol with mutual authentication accomplished using a certificate chain having a root certificate;
a client in the first cluster, the client originating traffic to a second cluster for processing, the second cluster having access to the root certificate;
the first service mesh configured to:
route the traffic to the second cluster using a secure communications protocol with mutual authentication;
carry out mutual authentication between the first cluster and the second cluster using certificate chains having the root certificate; and
in response to the mutual authentication being successful, route the application data to the second cluster using the secure communications protocol such that the application data may be processed at the second cluster to provide the service.

Clause N. The communications network of clause M wherein the first cluster comprises a plurality of units, each unit comprising a proxy and a either a server or a client, where a server comprises a smallest deployable piece of functionality of the service and wherein a client has ability to request functionality from a server.

Clause O. The communications network of clause N wherein the first service mesh comprises the proxies and a control plane.

Clause P. The communications network of clause M or clause N comprising the second cluster and a second service mesh, in the second cluster, to ensure that traffic communicated in the second cluster is communicated using a secure communications protocol with mutual authentication accomplished using a certificate chain having the root certificate, and where the second service mesh is independent of the first service mesh except for the root certificate.

Clause Q. The communications network of clause P wherein the second service mesh comprises rules such that the second service mesh is able to accept certificates that have been signed by the first cluster and include a trust domain string of the first cluster.

Clause R. The communications network of clause P or clause Q wherein the first cluster provides the service in the first cluster, in addition to the second cluster providing the service, and wherein the service is hidden from the first service mesh such that a control plane of the first service mesh does not configure the proxy with potentially conflicting rules.

Clause S. The communications network of any of claims M to R wherein the secure communications protocol is mutual transport layer security, mTLS.

Clause T. A communications network comprising:
a first cluster;
a second cluster;
a first service mesh in the first cluster, the first service mesh configured to ensure that traffic to which a service is to be applied is communicated within the first cluster using a secure communications protocol with mutual authentication accomplished using a certificate chain having a root certificate;
a client in the first cluster, the client originating traffic to the second cluster for processing, the second cluster having access to the root certificate;
the first service mesh configured to:
route the traffic to the second cluster using a secure communications protocol with mutual authentication;
carry out mutual authentication between the first cluster and the second cluster using certificate chains having the root certificate; and
in response to the mutual authentication being successful, route application data to the second cluster using the secure communications protocol such that the application data may be processed at the second cluster to provide the service; and
wherein the second cluster comprises a service mesh which is independent of the first service mesh except for the root certificate.

Clause U. A method of processing data traffic in a communications network comprising a first cluster comprising one or more compute nodes and a second cluster comprising one or more compute nodes, the first and second clusters configured to provide a service in the communications network, the method comprising:
receiving, by the first cluster, first data traffic;
communicating the first data traffic within the first cluster using a first service mesh in the first cluster, wherein the first data traffic is communicated within the first cluster using a secure communications protocol with mutual authentication based on a certificate chain having a root certificate;
generating, by a client executing in the first cluster, second data traffic for processing by the second cluster, the second cluster having access to the root certificate;
using the first service mesh, routing the second data traffic to the second cluster using the secure communications protocol with mutual authentication;
performing mutual authentication between the first cluster and the second cluster using at least the certificate chain having the root certificate; and
in response to performing the mutual authentication between the first cluster and the second cluster, routing application data from the client to the second cluster using the secure communications protocol, wherein the application data is usable to provide the service in the communications network.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of processing data traffic in a communications network comprising a first cluster comprising one or more compute nodes and a second cluster comprising one or more compute nodes, the first and second clusters configured to provide a service in the communications network, the method comprising:

receiving, by the first cluster, first data traffic;

communicating the first data traffic within the first cluster using a first service mesh in the first cluster, wherein the first data traffic is communicated within the first cluster using a secure communications protocol with mutual authentication based on a certificate chain having a root certificate, wherein the first cluster provides the service in the first cluster, in addition to the second cluster providing the service;

generating, by a client executing in the first cluster, second data traffic for processing by the second cluster, the second cluster having access to the root certificate and having a second service mesh that is independent of the first service mesh, wherein the first and second service meshes are configured to use root certificate to issue leaf certificates to proxies of the first and second service meshes, and wherein each virtual machine of the first and second clusters are configured to trust the root certificate;

using the first service mesh, routing the second data traffic to the second cluster using the secure communications protocol with mutual authentication;

performing mutual authentication between the first cluster and the second cluster using at least the certificate chain having the root certificate; and in response to performing the mutual authentication between the first cluster and the second cluster, routing application data from the client to the second cluster using the secure communications protocol, wherein the application data is usable to provide the service in the communications network, and wherein a control plane of the first service mesh does not configure a proxy of the first service mesh with conflicting rules.

2. The method of claim 1, wherein routing the second data traffic to the second cluster comprises using a configuration of an existing proxy in the first service mesh, and modifying rules in the configuration to specify that traffic routed to the second cluster is to be sent using the secure communications protocol with mutual authentication.

3. The method of claim 2, wherein the configuration of the existing proxy uses a static topology-agnostic configuration to identify traffic to be sent using the secure communications protocol with mutual authentication.

4. The method of claim 2, wherein the configuration of the existing proxy is sent to the existing proxy by the control plane of the first service mesh, and wherein the method comprises intercepting the configuration of the existing proxy after it is sent by the control plane and modifying it before it is received by the existing proxy.

5. The method of claim 2, wherein the configuration comprises a rule indicating that traffic addressed to a specified port number of a server in the second cluster is to be sent using the secure communications protocol with mutual authentication.

6. The method of claim 1, further comprising replacing an existing proxy in the first service mesh with an alternative proxy, the alternative proxy having a configuration comprising rules to specify that traffic to be routed to the second cluster is to be sent using the secure communications protocol with mutual authentication.

7. The method of claim 1, further comprising:
modifying rules in the first service mesh such that the first service mesh is configured to accept certificates that have been signed by the second cluster and include a trust domain string of the second cluster.

8. The method of claim 7, wherein modifying rules in the first service mesh comprises modifying rules to allow specified cluster names, allow any name that matches an expression, or allow any certificate that is signed using the root certificate.

9. The method of claim 1, wherein the service is hidden from the first service mesh.

10. The method of claim 1, wherein the second service mesh is independent of the first service mesh except for the root certificate.

11. The method of claim 10, further comprising modifying rules in the second service mesh such that the second service mesh is configured to accept certificates that have been signed by the first cluster and include a trust domain string of the first cluster.

12. The method of claim 1, wherein the method is performed for an existing service without modification to the existing service.

13. A communications network comprising a plurality of computing devices, the communications network comprising:
a first cluster;
a first service mesh in the first cluster, the first service mesh configured to ensure that traffic to which a service is to be applied is communicated within the first cluster using a secure communications protocol with mutual authentication accomplished using a certificate chain having a root certificate;
a client in the first cluster, the client originating traffic to a second cluster for processing, the second cluster having access to the root certificate and having a second service mesh that is independent of the first service mesh, wherein the first and second service meshes are configured to use root certificate to issue leaf certificates to proxies of the first and second service meshes, and wherein each virtual machine of the first and second clusters are configured to trust the root certificate, wherein the first cluster provides the service in the first cluster, in addition to the second cluster providing the service;
the first service mesh configured to:
route the traffic to the second cluster using a secure communications protocol with mutual authentication;
perform mutual authentication between the first cluster and the second cluster using certificate chains having the root certificate; and
in response to the mutual authentication being successful, route application data to the second cluster using the secure communications protocol such that the application data may be processed at the second cluster to provide the service, and wherein a control plane of the first service mesh does not configure a proxy of the first service mesh with conflicting rules.

14. The communications network of claim 13, wherein the first cluster comprises a plurality of units, each unit comprising a proxy and either a server or a client, wherein a unit comprises a smallest deployable piece of functionality of the service and wherein a client has ability to request functionality from a server.

15. The communications network of claim 14, wherein the first service mesh comprises the proxies of the plurality of units.

16. The communications network of claim 14, wherein the service is hidden from the first service mesh.

17. The communications network of claim 13, wherein the second service mesh is independent of the first service mesh except for the root certificate.

18. The communications network of claim 17, wherein the second service mesh comprises rules such that the second service mesh is able to accept certificates that have been signed by the first cluster and include a trust domain string of the first cluster.

19. The communications network of claim 13, wherein the secure communications protocol is mutual transport layer security (mTLS).

20. A communications network comprising a plurality of computing devices, the communications network comprising:
a first cluster;
a second cluster;
a first service mesh in the first cluster, the first service mesh configured to ensure that traffic to which a service is to be applied is communicated within the first cluster using a secure communications protocol with mutual authentication accomplished using a certificate chain having a root certificate;
a client in the first cluster, the client originating traffic to the second cluster for processing, the second cluster having access to the root certificate and having a second service mesh that is independent of the first service mesh, wherein the first and second service meshes are configured to use root certificate to issue leaf certificates to proxies of the first and second service meshes, and wherein each virtual machine of the first and second clusters are configured to trust the root certificate, wherein the first cluster provides the service in the first cluster, in addition to the second cluster providing the service;
the first service mesh configured to:
route the traffic to the second cluster using a secure communications protocol with mutual authentication;
carry out mutual authentication between the first cluster and the second cluster using certificate chains having the root certificate; and
in response to the mutual authentication being successful, route application data to the second cluster using the secure communications protocol such that the application data may be processed at the second cluster to provide the service; and
wherein the second cluster comprises a service mesh which is independent of the first service mesh except for the root certificate, and wherein a control plane of the first service mesh does not configure a proxy of the first service mesh with conflicting rules.

* * * * *